(No Model.)
A. FOUGÈRE.
NUT LOCK.
No. 465,094. Patented Dec. 15, 1891.
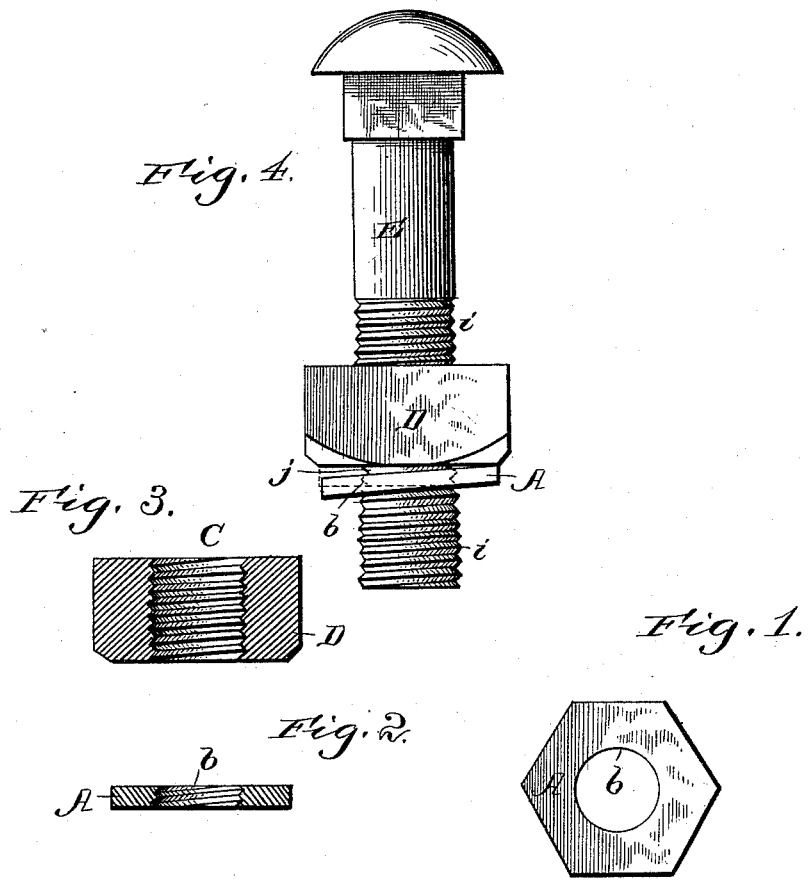
Witnesses:
J. B. McGirr.
Jas. S. Benedict.
Inventor.
Angus Fougère
By Joseph A. Harris
Attorney

UNITED STATES PATENT OFFICE.

ANGUS FOUGÈRE, OF MONCTON, CANADA, ASSIGNOR OF TWO-THIRDS TO CHARLES C. DAVISON AND JOSEPH A. HARRIS.

NUT-LOCK.

SPECIFICATION forming part of Letters Patent No. 465,094, dated December 15, 1891.

Application filed August 7, 1890. Serial No. 361,405. (No model.)

*To all whom it may concern:*

Be it known that I, ANGUS FOUGÈRE, a subject of the Queen of Great Britain, residing in Moncton, in the county of Westmoreland and Province of New Brunswick, in the Dominion of Canada, have invented a new and useful device for the better fastening and securing of nuts on bolts, as well as an improvement in nut-locks and screw-nuts, of which the following specification or description, taken in connection with the accompanying drawings, making a part of the same, is a clear and exact specification thereof.

My invention relates to an improvement in nut fastenings or bolts or in nut-locks and nuts used in connection with bolt and nut fastenings, by means of which screw-nuts may be permanently secured and held so firmly in position as not to be moved or worked loose by any action of machinery, their own action, or by any vibration whatever without destroying or partially destroying the thread upon the bolt, my object being to secure safety, economy, and neatness of finish, while at the same time the device may be used in some cases as a combined nut and nut-lock in one piece, the friction being greatly increased as the nut-lock is moved or set against the nut.

My invention consists in the combination, with a bolt and a primary nut, of a flat locking plate or washer of suitable thickness and flexibility to constitute or form a spring-plate and provided with a thread cut at a suitable angle or bevel, according to the size of the bolts and nuts used, so that said locking-plate will move along the bolt in an oblique position. As the locking plate or washer approaches the primary nut it operates to fasten the nut, and the latter reacts to hold the plate in place, and a tight bearing or contact first takes place on the side of the plate that first contacts with the nut, while the other side will show no bearing; but as the locking-plate is screwed home by being turned by a suitable implement the elasticity or flexibility of the plate causes it to yield or give to permit the locking-plate being screwed up far enough to bear flat against the nut and close the space between the nut and said plate, whereby the frictional contact of the locking-plate with the nut and the tension or force of the bent or deflected elastic plate holds the nut so tightly that it cannot be loosened under any circumstances, except the unscrewing of the locking-plate by suitable appliances.

I have ascertained by experiments that the thread of the nut-lock should be cut at an angle of from two to four degrees from the square, and it is better that it do not contain more than from one to two threads, the said angles and threads to be made to correspond with the size of nut that is required for use. On large nuts the angle should be less and the thread greater in length, while in small nut-locks the angle may be increased and the thread shortened. It is the angle or bevel of the thread cut in the nut-lock causing the oblique position of the same on the bolt, together with the flexible elastic locking-plate or washer adapted to be bent or deflected from its oblique position by frictional contact with the primary nut as said plate or washer is screwed home, as hereinbefore described, that constitutes the value of my invention, as well as the compound pressure that is brought to bear upon the parts.

In the drawings similar letters will represent similar parts in the several figures.

Figure 1 represents a top view of the nut-lock A. Fig. 2 is a vertical section thereof, showing the position and angle or bevel of the thread $b$. Fig. 3 is a vertical section of the nut-lock D, showing thread C in comparison with the thread on the nut-lock A. Fig. 4 is an elevation of my improved nut-lock, showing by dotted lines the final position of the locking-plate or washer when it is forced or screwed home tightly against the face of the primary nut to secure the increased or compound frictional contact, the initial position of the plate or washer A before it is tightened or set against the bolt being shown by full lines.

To show the working of my invention, take the nut-lock A and place it on thread $i$ of bolt E and move it up until one part of it touches nut D. In placing it thus toward the face of the nut it will, before being tightened, be on an angle from nut D, owing to the bevel of thread $b$, that is cut in nut-lock A, and a space will appear on the opposite side, as shown at *j*.

The locking-plate or washer A is made of a flat piece of steel of suitable thickness and properly tempered to make said plate somewhat elastic or flexible, so that under considerable strain or pressure, as when the plate or washer is screwed tight against the primary nut, said plate will yield or give sufficiently to enable it to be forced tightly against the primary nut.

In tightening nut-lock A against nut D a compound friction is produced differing from the friction in ordinary nuts by reason of the oblique position of nut-lock A upon the bolt and to the elasticity of the plate or washer A. Thread *b* and thread *i*, coming in contact at an angle, as before mentioned, will operate and bind strongly against each other, and as the pressure is exerted upon the nut-lock A the binding will be upon the nut D at its first point of contact with the nut-lock and be gradually increased as the opposite side of nut-lock A moves toward and comes in contact with nut D, until the whole face of the nut-lock bears tightly against the nut, and when thus firmly set a solid and complete fastening is obtained, inasmuch as the two cannot be moved at once or together in any direction without destroying or partly destroying the thread on the bolt E, and the friction of the two threads *b* and *i*, having an inclination to cross each other, combined with the pressure of nut-lock A against the nut D, will cause the nut D to be held permanently fixed upon the bolt as the nut-lock A is held firmly against nut D.

I do not confine myself to the precise form of the parts shown, as some variations may be made without materially departing from the scope and object of my device; but,

Having thus described my invention, I claim as new, and desire to secure by Letters Patent, the following:

1. The combination, with a bolt and primary nut, of the elastic washer or locking-plate having an oblique thread cut diagonally therein to its faces and screwed on the bolt exteriorly of the primary nut, said elastic washer being deflected or bent from its initial diagonal position on the bolt by contact with the nut and bearing against said nut with increased force or compound frictional contact, in the manner and for the purposes herein described.

2. In a nut-lock, the combination, with a bolt and a primary nut, of the inclined locking-plate or washer arranged on the bolt exteriorly of the nut thereon and having the oblique threads cut at an angle to its faces, said flat locking-plate lying at an angle to the face of the nut and being of suitable thickness and temper in proportion to the nut and bolt to spring or yield as the contact between the faces of the nut and plate are increased, whereby the locking-plate is bent or deflected as it is screwed home and a compound frictional contact is secured between said plate and nut without deflecting the end of the bolt, as set forth.

In testimony that I claim the foregoing I have hereunto set my hand and seal this 16th day of July, A. D. 1890.

ANGUS FOUGÈRE. [L. S.]

Witnesses:
C. C. DAVISON,
I. F. HARRIS,
ALEX CARTER.